(12) United States Patent
Rodriguez et al.

(10) Patent No.: US 11,983,520 B2
(45) Date of Patent: May 14, 2024

(54) METHOD AND APPARATUS FOR PROJECT TRANSFORMATION AND MIGRATION AUTOMATION

(71) Applicant: JPMorgan Chase Bank, N.A., New York, NY (US)

(72) Inventors: Andrew Tayag Rodriguez, Edgewater, NJ (US); Haim Azar, Secaucus, NJ (US); Michael Lee Dowling, Fort Lauderdale, FL (US); Vadim Zalmanov, Middle Village, NY (US); Inna Grosheva, Staten Island, NY (US); Claire Kegler Fox, Madison, NJ (US); Narsimha Anumala, Iselin, NJ (US); Milben Tan, Sayreville, NJ (US); Jack Szulc, Scotch Plains, NJ (US); Vincent Demartines, Staten Island, NY (US); Louise Staton-Bevan, Hoboken, NJ (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 200 days.

(21) Appl. No.: 17/648,479

(22) Filed: Jan. 20, 2022

(65) Prior Publication Data

US 2022/0229648 A1    Jul. 21, 2022

Related U.S. Application Data

(60) Provisional application No. 63/139,996, filed on Jan. 21, 2021.

(51) Int. Cl.
  *G06F 8/61* (2018.01)
  *G06F 8/76* (2018.01)
  *G06F 16/21* (2019.01)

(52) U.S. Cl.
  CPC ............. *G06F 8/63* (2013.01); *G06F 8/76* (2013.01); *G06F 16/213* (2019.01)

(58) Field of Classification Search
  None
  See application file for complete search history.

(56) References Cited

U.S. PATENT DOCUMENTS

| 6,895,382 B1* | 5/2005 | Srinivasan | G06Q 10/06395 |
| | | | 705/7.17 |
| 9,773,216 B2* | 9/2017 | Bain | G06Q 10/103 |
| 10,956,242 B1* | 3/2021 | Kumar | G06F 8/76 |

(Continued)

*Primary Examiner* — Andrew M. Lyons
(74) *Attorney, Agent, or Firm* — GREENBLUM & BERNSTEIN, P.L.C.

(57) ABSTRACT

Various methods, apparatuses/systems, and media for implementing automatic project transformation and migration processes are disclosed. A processor accesses a private cloud to fetch data related to a state of a project and posts migration mapping data to a migration director corresponding to the project based on the fetched data. The processor also sets user interface state according to project migration state; queues the project for processing; transforms the project to a standardized line of business (LOB) configuration; determines that a validation environment is in a clean configuration; migrates, based on determining that the validation environment is in a clean configuration, the transformed project to the validation environment; and receives user input to approve the migrated project.

20 Claims, 6 Drawing Sheets

(56) References Cited

U.S. PATENT DOCUMENTS

| | | | |
|---|---|---|---|
| 11,481,213 B2* | 10/2022 | Esponda | H04L 67/125 |
| 2006/0235899 A1* | 10/2006 | Tucker | G06F 16/214 |
| 2012/0246170 A1* | 9/2012 | Iantorno | G06F 11/3672 |
| | | | 707/E17.071 |
| 2015/0082224 A1* | 3/2015 | Hathaway | G06F 9/451 |
| | | | 715/771 |
| 2020/0042623 A1* | 2/2020 | Barnes | G06Q 10/103 |

* cited by examiner

METHOD AND APPARATUS FOR PROJECT TRANSFORMATION AND MIGRATION AUTOMATION

CROSS-REFERENCE TO RELATED APPLICATIONS

This application claims the benefit of priority from U.S. Provisional Patent Application No. 63/139,996, filed Jan. 21, 2021, which is herein incorporated by reference in its entirety.

TECHNICAL FIELD

This disclosure generally relates to project transformation and migration, and, more particularly, to methods and apparatuses for implementing an automated project transformation and migration module that automatically transforms projects to a standardized line of business (LOB) configuration and automatically migrates the transformed projects to data center servers.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Across the multiple LOBs at an organization, thousands of projects (i.e., JIRA projects) spanning across a plurality of (i.e., more than twenty) standalone server installations (i.e., JIRA server installations) with differing configurations may prove to be extremely difficult to manage. In addition, LOB level reporting may not possible due to the inconsistencies of project configurations. JIRA performance may also be degraded as a result of excessive configuration customization in each server. Thus, there is a need to consolidate projects into LOB specific JIRA data center installations. Further, conventional migration tools may only move projects from one server to another, but lack the capabilities of transforming projects to standardized LOB configuration.

SUMMARY

The present disclosure, through one or more of its various aspects, embodiments, and/or specific features or sub-components, may provide, among others, various systems, servers, devices, methods, media, programs, and platforms for implementing a project transformation and migration module that automatically transforms projects to a standardized LOB configuration and automatically migrates the transformed projects to data center servers, but the disclosure is not limited thereto.

According to exemplary embodiments, The present disclosure, through one or more of its various aspects, embodiments, and/or specific features or sub-components, may also provide, among others, various systems, servers, devices, methods, media, programs, and platforms for implementing a project transformation and migration module that implements a safety mechanism that protects production data by offloading the transformation process to containerized JIRAs (Docker containers running in an open-source container-orchestration system (i.e., Kubernetes)) to protect production data both at the source and target, but the disclosure is not limited thereto. For example, the project transformation and migration module, according to exemplary embodiments, may be configured to automatically migrate the transformed projects to a validation environment where project owners are able to review them. Once approved, the entire transformation/migration process, according to exemplary embodiments, may be repeated targeting the LOB's production JIRA data center, but the disclosure is not limited thereto.

According to exemplary embodiments, The present disclosure, through one or more of its various aspects, embodiments, and/or specific features or sub-components, may also provide, among others, various systems, servers, devices, methods, media, programs, and platforms for implementing a project transformation and migration module that is configured to provide full automation of JIRA issue mappings between instances, introduce that standardization templates, preserve audit log, ownership, comments, copy JIRA attachments and eliminate the migration complexity thereby simplifying project migration processes.

According to an aspect of the present disclosure, a method for implementing automatic project transformation and migration processes by utilizing one or more processors and one or more memories is disclosed. The method may include: accessing a private cloud to fetch data related to a state of a project; posting migration mapping data to a migration director corresponding to the project based on the fetched data; setting user interface state according to project migration state; queuing the project for processing; transforming the project to a standardized line of business (LOB) configuration; determining that a validation environment is in a clean configuration; migrating, based on determining that the validation environment is in a clean configuration, the transformed project to the validation environment; and receiving user input to approve the migrated project.

According to another aspect of the present disclosure, wherein the validation environment is a target server.

According to yet another aspect of the present disclosure, wherein the migration director is a migration director running on an application platform of the private cloud.

According to an aspect of the present disclosure, wherein the mapping data may include one or more of the following data: issue type mapping data, custom field mapping data, and workflow status mapping data, but the disclosure is not limited thereto.

According to further aspect of the present disclosure, the method may further include: creating a snapshot of the project without attachments from a source server by utilizing corresponding application programming interface (API); downloading the snapshot to an application platform of the private cloud; deploying and configuring a transformation environment; transforming the project to the standardized LOB configuration in a containerized application form running on the application platform of the private cloud; and uploading and deploying the snapshot of the project to the transformation environment.

According to yet another aspect of the present disclosure, wherein transforming the project to the standardized LOB configuration may include one or more of the following: generating structured query language commands data based on the mapping data; transforming issue types data associated with the project; transforming custom fields data associated with the project; transforming workflow statuses data associated with the project; and transforming schemes associated with the project, but the disclosure is not limited thereto.

According to an aspect of the present disclosure, the method may further include: removing inactive issue types data that is older than a predetermined time frame; and removing custom fields that are not members of the standard configuration.

According to an additional aspect of the present disclosure, the method may further include: creating a new snapshot of the transformed project; downloading the new snapshot to an application platform of the private cloud; and uploading and deploying the new snapshot to the validation environment.

According to a further aspect of the present disclosure, wherein the validation environment is a target server which is a production data center, and in migrating the transformed project to the target server, the method may further include: copying attachments associated with the project from a source server to the target server.

According to yet another aspect of the present disclosure, a system for implementing automatic project transformation and migration processes is disclosed. The system may include a source server, a target server; and a processor operatively connected to the source server and the target server. The processor may be configured to: access a private cloud to fetch data related to a state of a project; post migration mapping data to a migration director corresponding to the project based on the fetched data; set user interface state according to project migration state; queue the project for processing; transform the project to a standardized LOB configuration; determine that a validation environment is in a clean configuration; migrate, based on determining that the validation environment is in a clean configuration, the transformed project to the validation environment; and receive user input to approve the migrated project.

According to further aspect of the present disclosure, the processor may be further configured to: create a snapshot of the project without attachments from a source server by utilizing corresponding application programming interface (API); download the snapshot to an application platform of the private cloud; deploy and configure a transformation environment; transform the project to the standardized LOB configuration in a containerized application form running on the application platform of the private cloud; and upload and deploy the snapshot of the project to the transformation environment.

According to yet another aspect of the present disclosure, wherein in transforming the project to the standardized LOB configuration, the processor may be further configured to: generate structured query language commands data based on the mapping data; transform issue types data associated with the project; transform custom fields data associated with the project; transform workflow statuses data associated with the project; and transform schemes associated with the project, but the disclosure is not limited thereto.

According to an aspect of the present disclosure, the processor may be further configured to: remove inactive issue types data that is older than a predetermined time frame; and remove custom fields that are not members of the standard configuration.

According to an additional aspect of the present disclosure, the processor may be further configured to: create a new snapshot of the transformed project; download the new snapshot to an application platform of the private cloud; and upload and deploy the new snapshot to the validation environment.

According to a further aspect of the present disclosure, wherein the validation environment is a target server which is a production data center, and in migrating the transformed project to the target server, the processor may be further configured to: copy attachments associated with the project from a source server to the target server.

According to a further aspect of the present disclosure, a non-transitory computer readable medium configured to store instructions for implementing automatic project transformation and migration processes is disclosed. The instructions, when executed, may cause a processor to perform the following: accessing a private cloud to fetch data related to a state of a project; posting migration mapping data to a migration director corresponding to the project based on the fetched data; setting user interface state according to project migration state; queuing the project for processing; transforming the project to a standardized LOB configuration; determining that a validation environment is in a clean configuration; migrating, based on determining that the validation environment is in a clean configuration, the transformed project to the validation environment; and receiving user input to approve the migrated project.

According to further aspect of the present disclosure, the instructions, when executed, may cause the processor to perform the following: creating a snapshot of the project without attachments from a source server by utilizing corresponding application programming interface (API); downloading the snapshot to an application platform of the private cloud; deploying and configuring a transformation environment; transforming the project to the standardized LOB configuration in a containerized application form running on the application platform of the private cloud; and uploading and deploying the snapshot of the project to the transformation environment.

According to another aspect of the present disclosure, in transforming the project to the standardized LOB configuration, the instructions, when executed, cause the processor to perform the following: generating structured query language commands data based on the mapping data; transforming issue types data associated with the project; transforming custom fields data associated with the project; transforming workflow statuses data associated with the project; and transforming schemes associated with the project.

According to an aspect of the present disclosure, the instructions, when executed, may cause the processor to further perform the following: removing inactive issue types data that is older than a predetermined time frame; and removing custom fields that are not members of the standard configuration.

According to an additional aspect of the present disclosure, the instructions, when executed, may cause the processor to further perform the following: creating a new snapshot of the transformed project; downloading the new snapshot to an application platform of the private cloud; and uploading and deploying the new snapshot to the validation environment.

According to a further aspect of the present disclosure, wherein the validation environment is a target server which is a production data center, and in migrating the transformed project to the target server, and wherein the instructions, when executed, may further cause the processor to perform the following: copying attachments associated with the project from a source server to the target server.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
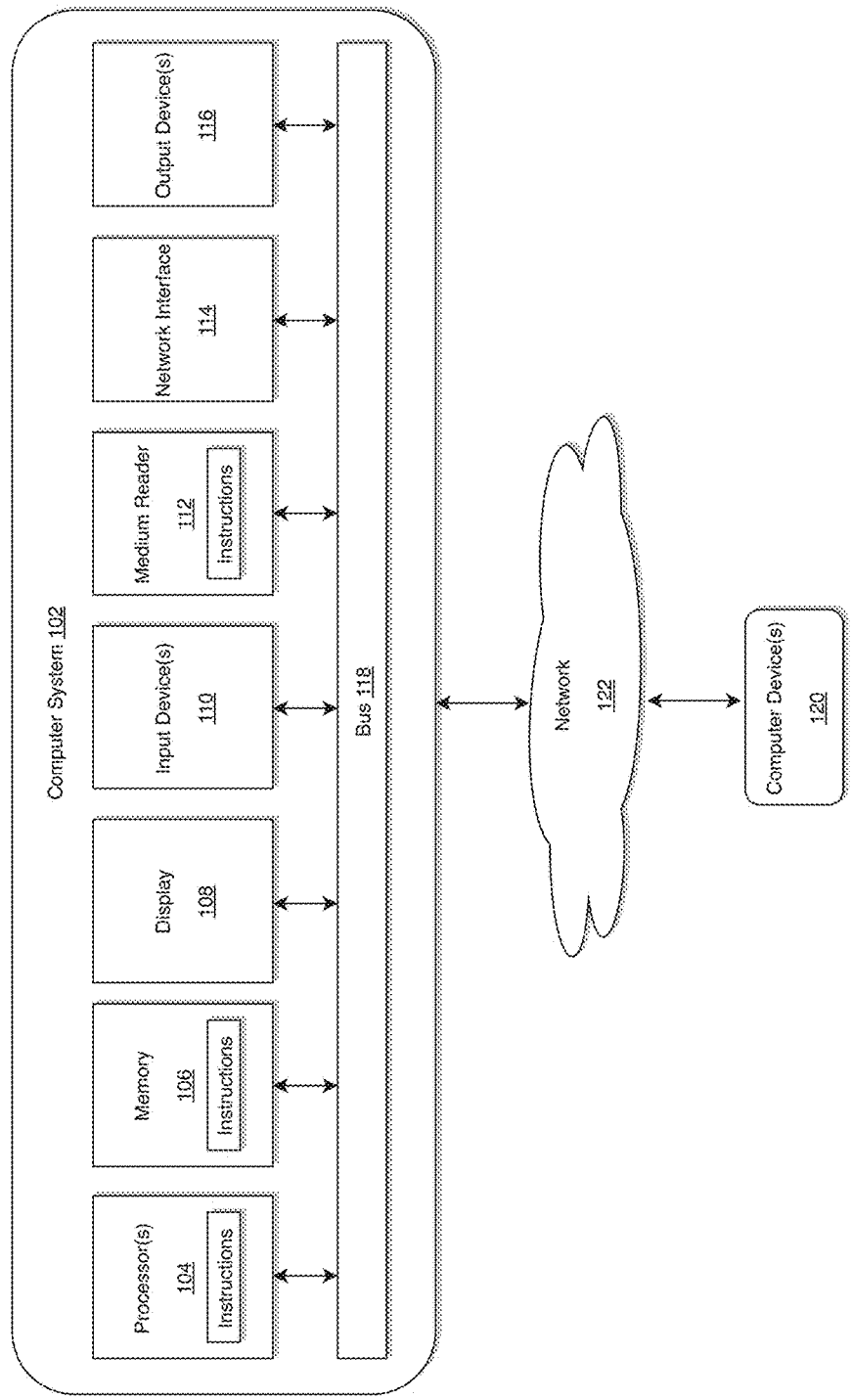
FIG. 1 illustrates a computer system for implementing a project transformation and migration module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units, engines, tools, devices and/or modules. Those skilled in the art will appreciate that these blocks, units, engines, tools, devices, and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units, engines, tools, devices, and/or modules being implemented by microprocessors or similar, they may be programmed using software (e.g., microcode) to perform various functions discussed herein and may optionally be driven by firmware and/or software. Alternatively, each block, unit, engine, tool device, and/or module may be implemented by dedicated hardware, or as a combination of dedicated hardware to perform some functions and a processor (e.g., one or more programmed microprocessors and associated circuitry) to perform other functions. Also, each block, unit, engine, tool, device, and/or module of the example embodiments may be physically separated into two or more interacting and discrete blocks, units, engines, tools, devices, and/or modules without departing from the scope of the inventive concepts. Further, the blocks, units, engines, tools, devices, and/or modules of the example embodiments may be physically combined into more complex blocks, units, engines, tools, devices, and/or modules without departing from the scope of the present disclosure.

FIG. 1 is an exemplary system for use in implementing automatic project transformation and migration processes in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment (private and/or public). Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes of implementing a project transformation and migration module that automatically transforms projects to a standardized LOB configuration and automatically migrates the transformed projects to data center servers, but the disclosure is not limited thereto.

Figure 2:
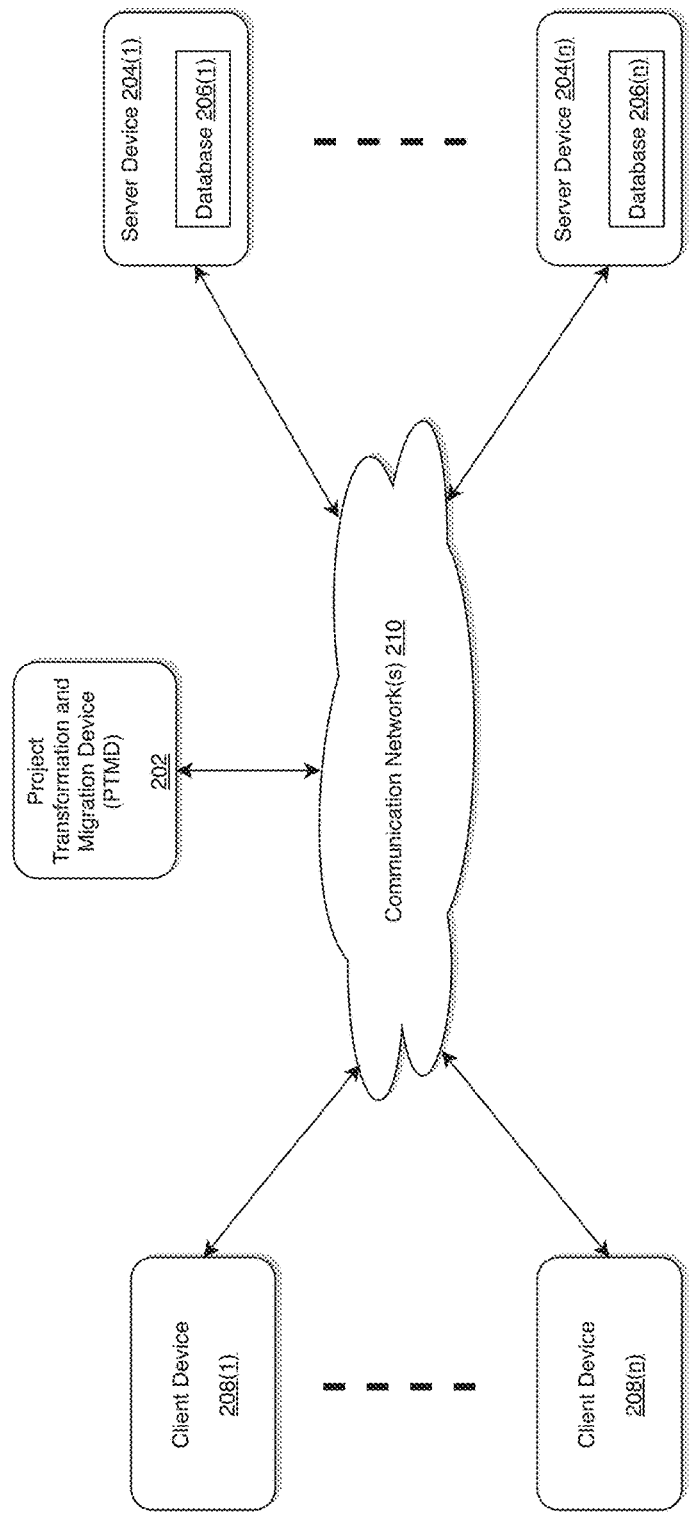
FIG. 2 illustrates an exemplary network diagram of a project transformation and migration device in accordance with an exemplary embodiment.

Referring to FIG. 2, a schematic of an exemplary network environment 200 for implementing a project transformation and migration device (PTMD) of the instant disclosure is illustrated.

According to exemplary embodiments, the above-described problems associated with conventional tools/systems may be overcome by implementing a PTMD 202 as illustrated in FIG. 2 to automatically transform projects to a standardized LOB configuration and automatically migrate the transformed projects to data center servers, but the disclosure is not limited thereto.

The PTMD 202 may be the same or similar to the computer system 102 as described with respect to FIG. 1.

The PTMD 202 may store one or more applications that can include executable instructions that, when executed by the PTMD 202, cause the PTMD 202 to perform actions, such as to transmit, receive, or otherwise process network messages, for example, and to perform other actions described and illustrated below with reference to the figures. The application(s) may be implemented as modules or components of other applications. Further, the application(s) can be implemented as extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the PTMD 202 itself, may be located in virtual server(s) running in a cloud-based computing environment rather than being tied to one or more specific physical network computing devices. Also, the application(s) may be running in one or more virtual machines (VMs) executing on the PTMD 202. Additionally, in one or more embodiments of this technology, virtual machine(s) running on the PTMD 202 may be managed or supervised by a hypervisor.

In the network environment 200 of FIG. 2, the ACD 202 is coupled to a plurality of server devices 204(1)-204(n) that hosts a plurality of databases 206(1)-206(n), and also to a plurality of client devices 208(1)-208(n) via communication network(s) 210. A communication interface of the PTMD 202, such as the network interface 114 of the computer system 102 of FIG. 1, operatively couples and communicates between the PTMD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the PTMD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The PTMD 202 may be a standalone device or integrated with one or more other devices or apparatuses, such as one or more of the server devices 204(1)-204(n), for example. In one particular example, the PTMD 202 may be hosted by one of the server devices 204(1)-204(n), and other arrangements are also possible. Moreover, one or more of the devices of the PTMD 202 may be hosted in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the PTMD 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include specific type of computing device that can facilitate the implementation of the PTMD 202 that may automatically transform projects to a standardized LOB configuration and automatically migrate the transformed projects to data center servers, but the disclosure is not limited thereto.

Accordingly, the client devices 208(1)-208(n) may be mobile computing devices, desktop computing devices, laptop computing devices, tablet computing devices, virtual machines (including cloud-based computers), for example.

The client devices 208(1)-208(n) may run interface applications, such as standard web browsers or standalone client applications, which may provide an interface to communicate with the PTMD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the PTMD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the PTMD 202, the server devices 204(1)-204(n), or the client devices 208(1)-208(n), for example, may be configured to operate as virtual instances on the same physical machine. For example, one or more of the PTMD 202, the server devices 204(1)-204(n), or the client devices 208(1)-208(n) may operate on the same physical device rather than as separate devices communicating through communication network(s) 210. Additionally, there may be more or fewer PTMD 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only tele-traffic in any suitable form (e.g., voice and modem), wireless traffic networks, cellular traffic networks, Packet Data Networks (PDNs), the Internet, intranets, and combinations thereof.

Figure 3:
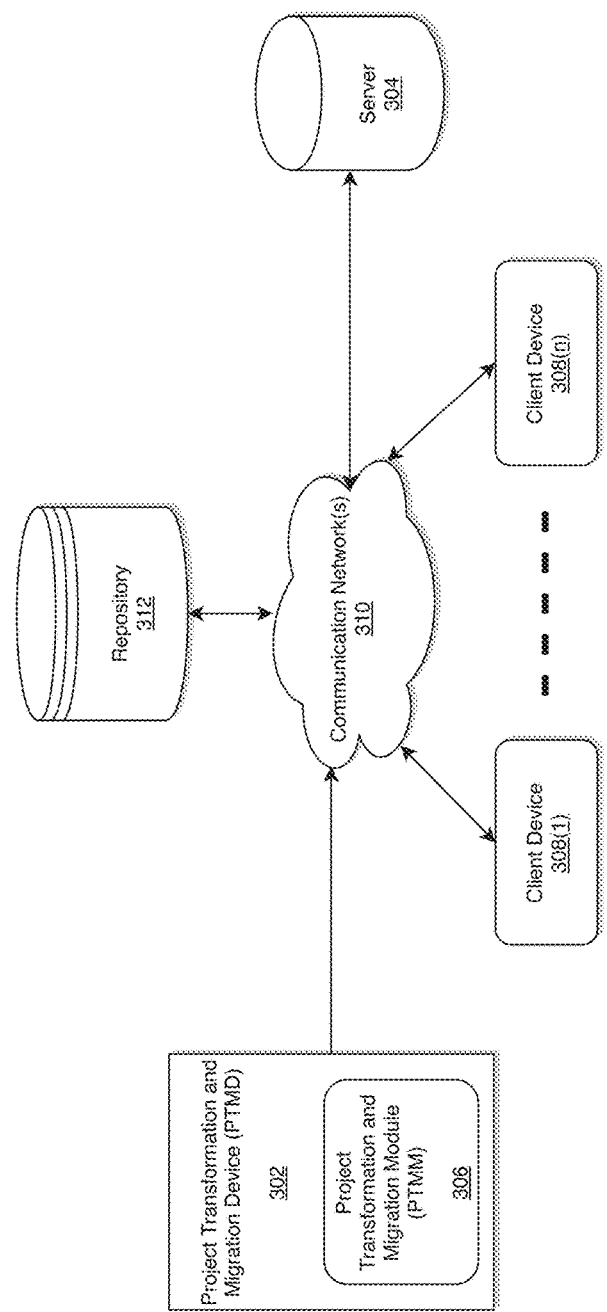
FIG. 3 illustrates a system diagram for implementing a project transformation and migration device with a project transformation and migration module in accordance with an exemplary embodiment.
Figure 4:
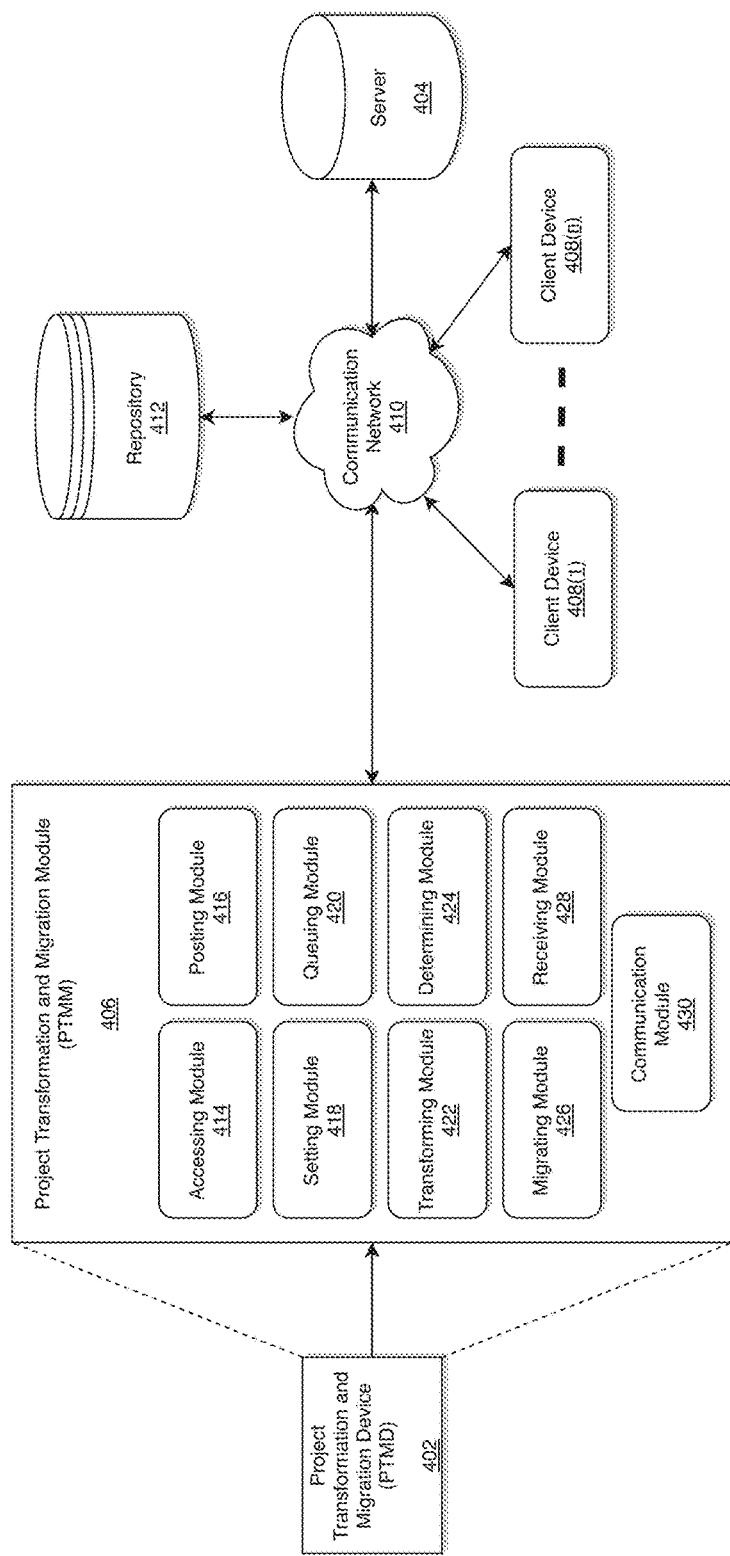
FIG. 4 illustrates a system diagram for implementing the project transformation and migration module of FIG. 3 in accordance with an exemplary embodiment.
Figure 5:
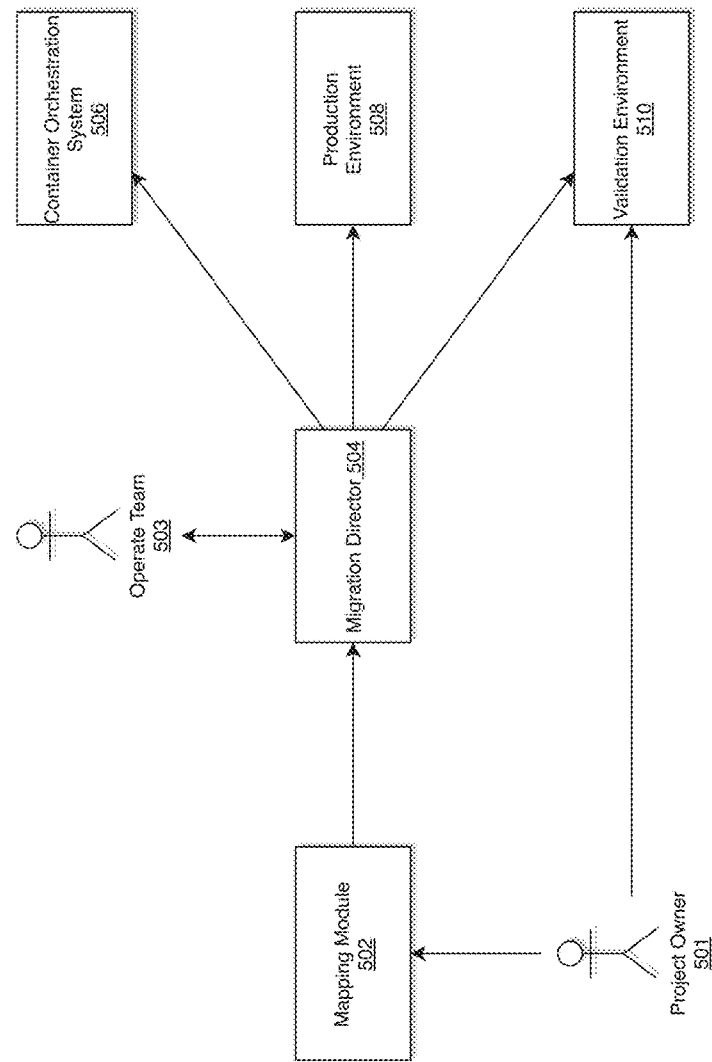
FIG. 5 illustrates a system diagram for implementing automatic project transformation and migration processes in accordance with an exemplary embodiment.

FIG. 3 illustrates a system diagram for implementing a project transformation and migration device (PTMD) with a project transformation and migration module (PTMM) in accordance with an exemplary embodiment. According to exemplary embodiments, the PTMM may be implemented locally and the local PTMM may include tools/modules to implement the processes of automatically transforming projects to a standardized LOB configuration and automatically migrating the transformed projects to data center servers as illustrated in FIGS. 4 and 5.

As illustrated in FIG. 3, in the system 300, according to exemplary embodiments, the PTMD 302 along with the PTMM 306 may be connected to a server 304 and repository 312 via a communication network 310, but the disclosure is not limited thereto. For example, according to exemplary embodiments, the PTMD 302 may be connected to any desired databases besides the server 304 and the repository 312.

According to exemplary embodiments, the server 304 and the repository 312 may include memories that may store data related to a state of a project, but the disclosure is not limited thereto.

According to exemplary embodiment, the PTMD 302 may include other rules, policies, modules, databases, or applications, for example. According to exemplary embodiments, the server 304 may be configured to store information including the metadata, but the disclosure is not limited thereto. According to exemplary embodiments, PTMD 302 may contain multiple stages connecting to various other tools to perform the required processes.

According to exemplary embodiments, the PTMD 302 may be configured to receive continuous feed of data from the server 304 and the repository 312 via the communication network 310. According to exemplary embodiments, the PTMD 302 may also be configured to communicate with one or more client devices 308(1)-308(n) (e.g., user's devices, application developing devices, etc.) via the communication network 310, but the disclosure is not limited thereto. According to exemplary embodiments, the client devices 308(1)-308(n) may also be referred to as organizer's systems/devices.

As will be described below, the PTMM 306 may be configured to access a private cloud to fetch data related to a state of a project; post migration mapping data to a migration director corresponding to the project based on the fetched data; set user interface state according to project migration state; queue the project for processing; transform the project to a standardized line of business (LOB) configuration; determine that a validation environment is in a clean configuration; migrate, based on determining that the validation environment is in a clean configuration, the transformed project to the validation environment; and receive user input to approve the migrated project, but the disclosure is not limited thereto.

According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the client devices 308(1)-308(n) may communicate with the PTMD 302 along with the PTMM 306 via broadband or cellular communication. Of course, these embodiments are merely exemplary and are not limiting or exhaustive.

FIG. 4 illustrates a system diagram for implementing the project transformation and migration module of FIG. 3 in accordance with an exemplary embodiment. FIG. 5 illustrates a system diagram for implementing automatic project transformation and migration processes in accordance with an exemplary embodiment.

As illustrated in FIG. 4, the system 400 may include a project transformation and migration device (PTMD) 402 with a project transformation and migration module (PTMM) 406 which may include tools/modules to implement the process of implementing a project transformation and migration module that automatically transforms projects to a standardized LOB configuration and automatically migrates the transformed projects to data center servers, but the disclosure is not limited thereto. For example, the PTMM 406 may be configured to implement a safety mechanism that protects production data by offloading the transformation process to containerized JIRAs (Docker containers running in an open-source container-orchestration system (i.e., Kubernetes)) to protect production data both at the source and target, but the disclosure is not limited thereto. For example, the PTMM 406, according to exemplary embodiments, may be configured to automatically migrate the transformed projects to a validation environment where project owners are able to review them. Once approved, the entire transformation/migration process, according to exemplary embodiments, may be repeated by the PTMM 406 targeting the LOB's production JIRA data center, but the disclosure is not limited thereto.

According to exemplary embodiments, the PTMM 406 may be operationally connected to one or more client devices 408(1)-408(n), a server 404, and one or more repository 412 a communication network 410.

As illustrated in FIG. 4, the PTMM 406 may include an accessing module 414, a posting module 416, a setting module 418, a queuing module 420, a transforming module 422, a determining module 424, a migrating module 426, a receiving module 428, and a communication module 430, but the disclosure is not limited thereto.

FIG. 5 illustrates a system diagram for implementing automatic project transformation and migration processes in accordance with an exemplary embodiment. As illustrated in FIG. 5, the system 500 may include a mapping module 502 operatively connected with a migration director 504. The migration director 504 may be implemented on a private cloud. According to exemplary embodiments the migration director 504 may be a JIRA migration director. As illustrated in FIG. 5, the migration director 504 may be operatively connected to a container orchestration system 506, a production environment 508, and a validation environment 510. The validation environment 510 may be a target server.

According to exemplary embodiments, the client devices 408(1)-408(n) as illustrated in FIG. 4 may be the same or similar to the client devices 308(1)-308(n) as illustrated in FIG. 3, the server 404 may be the same or similar to the server 304 as illustrated in FIG. 3, the repository 412 may be the same or similar to the repository 312 as illustrated in FIG. 3, and the communication network 410 may be same or similar to the communication network 310 as illustrated in FIG. 3. According to exemplary embodiments, the repository 312, 412 may be an internal database embedded within the PTMM 306, PTMM 406, respectively, but the disclosure is not limited thereto.

The process may be executed via the communication module 430 and the communication network 410 which may comprise plural networks as described above. For example, in an exemplary embodiment, the various components of the PTMM 406 may communicate with the various components of the repository 412, server 405, and the client devices 408(1)-408(n) via the communication module 430 and the communication network 410. Of course, these embodiments are merely exemplary and are not limiting or exhaustive.

According to exemplary embodiments, each of the accessing module 414, posting module 416, setting module 418, queuing module 420, transforming module 422, determining module 424, migrating module 426, receiving module 428, communication module 430, and the mapping module 502 may be implemented by microprocessors or similar, they may be programmed using software (e.g., microcode) to perform various functions discussed herein. Alternatively, each of the accessing module 414, posting module 416, setting module 418, queuing module 420, transforming module 422, determining module 424, migrating module 426, receiving module 428, communication module 430, and the mapping module 502 may be implemented by dedicated hardware, or as a combination of dedicated hardware to perform some functions and a processor (e.g., one or more programmed microprocessors and associated circuitry) to perform various functions discussed herein as well as other functions. Also, according to exemplary embodiments, each of the accessing module 414, posting module 416, setting module 418, queuing module 420, transforming module 422, determining module 424, migrating module 426, receiving module 428, communication module 430, and the mapping module 502 may be physically separated into two or more interacting and discrete blocks, units, engines, devices, and/or modules without departing from the scope of the inventive concepts.

According to exemplary embodiments, each of the accessing module 414, posting module 416, setting module 418, queuing module 420, transforming module 422, determining module 424, migrating module 426, receiving module 428, communication module 430, and the mapping module 502 may be invoked by corresponding API.

Referring to FIGS. 4-5, according to exemplary embodiments, the accessing module 414 may be configured to access a private cloud to fetch data related to a state of a project. The posting module 416 may be configured to post migration mapping data to the migration director 504 corresponding to the project based on the fetched data. The setting module 418 may set user interface state according to project migration state. The queuing module 420 may queue the project for processing.

According to exemplary embodiments, the transforming module 422 may be configured to transform the project to a standardized line of business (LOB) configuration. The determining module 424 may determine that a validation environment 510 is in a clean configuration.

According to exemplary embodiments, the migrating module 426 may be configured to migrate, based on determining by the determining module 424 that the validation environment 510 is in a clean configuration, the transformed project to the validation environment 510. The receiving module 428 may be configured to receive user input to approve the migrated project.

According to exemplary embodiments, the validation environment 510 may be a target server.

According to exemplary embodiments, the migration director 504 may be a JIRA migration director running on an application platform of the private cloud.

According to exemplary embodiments, the mapping data may include one or more of the following data: issue type mapping data, custom field mapping data, and workflow status mapping data, but the disclosure is not limited thereto.

According to exemplary embodiments, the PTMM 406 may be configured to: create a snapshot (i.e., backup) of the project without attachments from a source server (i.e., server 404) by utilizing corresponding application programming interface (API); download the snapshot to an application platform of the private cloud; deploy and configure a transformation environment; transform the project to the standardized LOB configuration in a containerized application form running on the application platform of the private cloud; and upload and deploy the snapshot of the project to the transformation environment. According to exemplary embodiments, the transformation environment may be implemented within a container orchestration system 506.

According to exemplary embodiments, wherein transforming the project to the standardized LOB configuration by the transforming module 422 may include one or more of the following: generating structured query language commands data based on the mapping data; transforming issue types data associated with the project; transforming custom fields data associated with the project; transforming workflow statuses data associated with the project; and transforming schemes associated with the project, but the disclosure is not limited thereto.

According to exemplary embodiments, the PTMM 406 may be configured to remove inactive issue types data (i.e., inactive JIRA issues) that is older than a predetermined time frame (i.e., more than twelve months); and remove custom fields that are not members of the standard configuration.

According to exemplary embodiments, the PTMM 406 may be configured to: create a new snapshot of the transformed project; download the new snapshot to an application platform of the private cloud; and upload and deploy the new snapshot to the validation environment 510.

According to exemplary embodiments, the validation environment 510 may be a target server which may be a production data center, and in migrating the transformed project to the target server, the PTMM 406 may be configured to copy attachments associated with the project from a source server to the target server.

Referring again to FIGS. 4-5, according to exemplary embodiments, the mapping module 502 may be implemented as JIRA plugin and the PTMM 406 may be configured to implement the following workflow to implementing automatic project transformation and migration processes.

For example, on opening a migration tool console (i.e., a JIRA migration tool console) by a user (i.e., project owner 501), the PTMM 406 may fetch the project status from the migration director 504 and set UI state according to the project migration state. The project owner 501, by utilizing a computing device (i.e., client device 408(1)-408(n)) and the mapping module 502 to map custom fields, workflow statuses, and issue types. The PTMM 406 may be receive input data from the project owner 501 to create a validation environment 510 (i.e., via a clicking action on a Create Validation Environment icon displayed by the PTMM 406.

According to exemplary embodiments, the migration director's 504 scheduler may pick up a project to migrate once CMJ (configuration manager for JIRA) is free. The PTMM 406 may create snapshot without attachments from source JIRA using CMJ API. The migration director 504 may download the snapshot via CMJ API. The migration director 504 may then process the snapshot, e.g., i) unzip, ii) remove filters and boards from XML, iii) rename duplicate fields to a unique name, iv) capture attachments folder structure, v) capture the original permission scheme, etc., but the disclosure is not limited thereto.

According to exemplary embodiments, the PTMM 406 may orchestrate short live JIRA instance with shared template on the container orchestration system 506 and create dummy attachments. The PTMM 406 may also deploy the processed snapshot to JIRA on the container orchestration system 506 using CMJ API and transform the project using a JIRA transformation API. The transformation processes may include, e.g., deleting old issues, transforming custom fields, transforming workflow statuses, transforming issue types, transforming schemes, cleaning up objects, etc., but the disclosure is not limited thereto.

According to exemplary embodiments, the PTMM 406 may create snapshot (without attachments) of transformed project using CMJ API and download the snapshot using CMJ API. After successful downloading, the PTMM 406 may terminate the container orchestration system (i.e., Kubernete s) instance.

According to exemplary embodiments, after successful downloading, the PTMM 406 may be configured to determine whether the status is transforming before validation. If it is determined that the status is "transforming before validation," the PTMM 406 may deploy the snapshot to validation environment 510 (i.e., target/validation server) using CMJ API and set status to "validating" and send an email to project owner 501. The project owner 501 may then validate the project migration and the project owner 501 clicks to approve or cancel the migration and the status update in the migration director 504.

According to exemplary embodiments, if it is determined that the status is "not transforming before validation," the PTMM 406 may set the permission scheme in the source JIRA to BROWSE_ONLY.

According to exemplary embodiments, the PTMM 406 may deploy snapshot to target JIRA with attachments folder point to NAS mount, apply permission scheme on target using the API (e.g., DevX API), and set migration status to "migrated" and send an email of completion to the project owner 501.

According to exemplary embodiments, an enterprise password vault —application identity management may be utilized for getting project status, creating snapshot, preparing Docker image, deploying to validation environment, and deploying to production environment, but the disclosure is not limited thereto.

The operate team 503 may be responsible for viewing project status or auditing project, managing migrations, application settings, etc., but the disclosure is not limited thereto.

Figure 6:
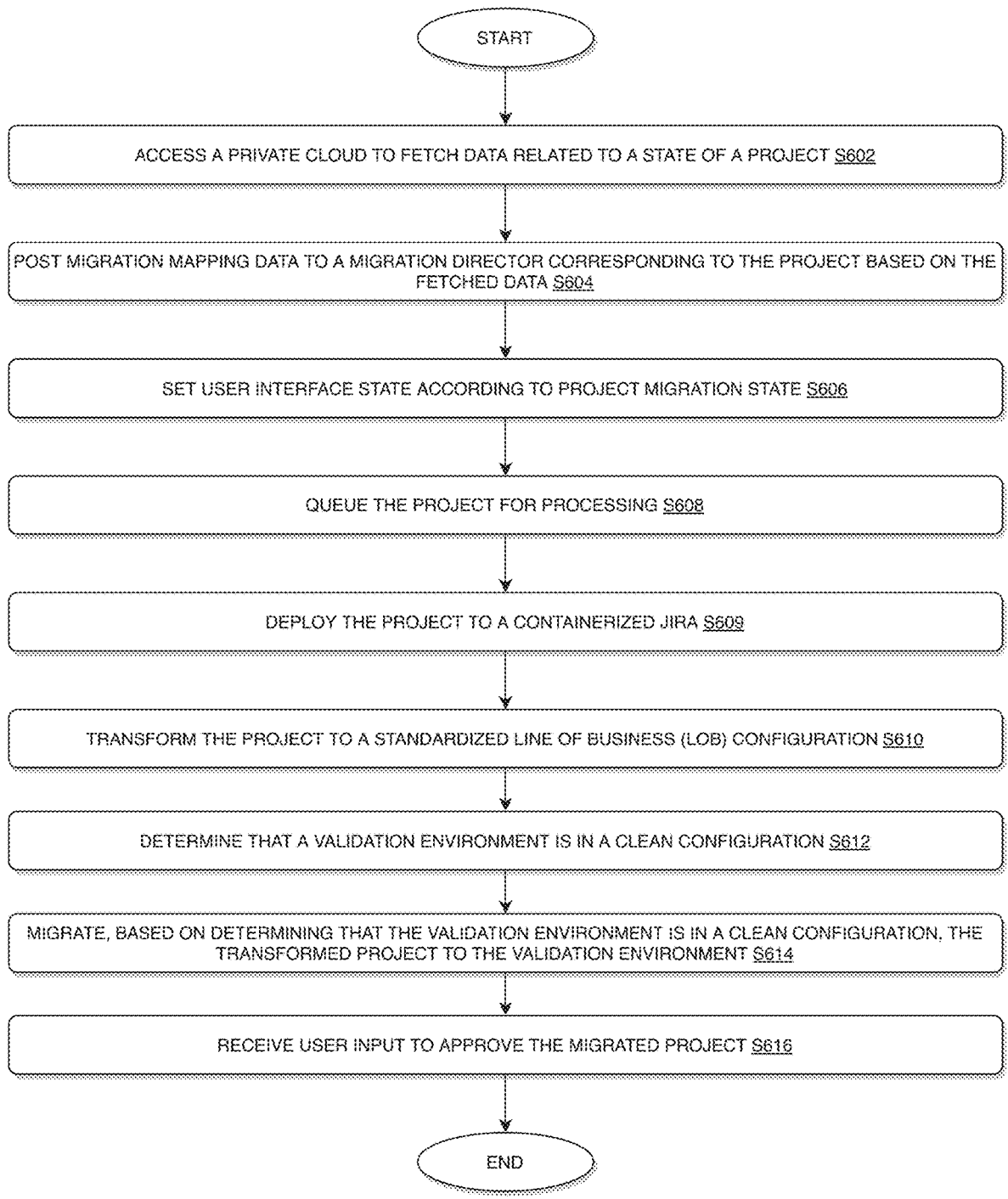
FIG. 6 illustrates a flow chart for implementing automatic project transformation and migration processes in accordance with an exemplary embodiment.

FIG. 6 illustrates a flow chart for implementing automatic project transformation and migration processes in accordance with an exemplary embodiment. It will be appreciated that the illustrated process 600 and associated steps may be performed in a different order, with illustrated steps omitted, with additional steps added, or with a combination of reordered, combined, omitted, or additional steps.

In the process 600 of FIG. 6, at step S602, a private cloud may be accessed to fetch data related to a state of a project.

At step 604, migration mapping data may be posted to a migration director corresponding to the project based on the fetched data.

At step 606, user interface state may be set according to project migration state.

At step 608, the project may be queued for processing.

At step 609, the project may be deployed to a containerized Jira.

At step 610, the project may be transformed to a standardized line of business (LOB) configuration.

At step 612, it may be determined that a validation environment is in a clean configuration.

At step 614, based on determining that the validation environment is in a clean configuration, the transformed project may be migrated to the validation environment.

At step 616, user input may be received to approve the migrated project.

According to exemplary embodiments, the process 600 may further include the following: creating a snapshot of the project without attachments from a source server by utilizing corresponding application programming interface (API); downloading the snapshot to an application platform of the private cloud; deploying and configuring a transformation environment; transforming the project to the standardized LOB configuration in a containerized application form running on the application platform of the private cloud; and uploading and deploying the snapshot of the project to the transformation environment.

According to exemplary embodiments, step 610 of the process 600 may include one or more of the following: generating structured query language commands data based on the mapping data; transforming issue types data associated with the project; transforming custom fields data associated with the project; transforming workflow statuses data associated with the project; and transforming schemes associated with the project, but the disclosure is not limited thereto.

According to exemplary embodiments, the process 600 may further include the following: removing inactive issue types' data that is older than a predetermined time frame; and removing custom fields that are not members of the standard configuration.

According to exemplary embodiments, wherein the validation environment may be a target server which is a production data center, and the step 614 of the process 600 may further include: copying attachments associated with the project from a source server to the target server.

According to exemplary embodiments, a non-transitory computer readable medium may be configured to store instructions for implementing the PTMM 406 to implement automatic project transformation and migration processes disclosed herein with reference to FIGS. 1-6, but the disclosure is not limited thereto. According to exemplary embodiments, the instructions, when executed, may cause a processor embedded within the PTMM 406 to perform the following: accessing a private cloud to fetch data related to a state of a project; posting migration mapping data to a migration director corresponding to the project based on the fetched data; setting user interface state according to project migration state; queuing the project for processing; transforming the project to a standardized line of business (LOB) configuration; determining that a validation environment is in a clean configuration; migrating, based on determining that the validation environment is in a clean configuration, the transformed project to the validation environment; and receiving user input to approve the migrated project. The processor may be the same or similar to the processor 104 as illustrated in FIG. 1.

According to exemplary embodiments, the instructions, when executed, may cause the processor 104 to perform the following: creating a snapshot of the project without attachments from a source server by utilizing corresponding application programming interface (API); downloading the snapshot to an application platform of the private cloud; deploying and configuring a transformation environment; transforming the project to the standardized LOB configuration in a containerized application form running on the application platform of the private cloud; and uploading and deploying the snapshot of the project to the transformation environment.

According to exemplary embodiments, in transforming the project to the standardized LOB configuration, the instructions, when executed, cause the processor 104 to perform the following: generating structured query language commands data based on the mapping data; transforming issue types data associated with the project; transforming custom fields data associated with the project; transforming workflow statuses data associated with the project; and transforming schemes associated with the project.

According to exemplary embodiments, the instructions, when executed, may cause the processor 104 to further perform the following: removing inactive issue types data that is older than a predetermined time frame; and removing custom fields that are not members of the standard configuration.

According to exemplary embodiments, the instructions, when executed, may cause the processor 104 to further perform the following: creating a new snapshot of the transformed project; downloading the new snapshot to an application platform of the private cloud; and uploading and deploying the new snapshot to the validation environment.

According to exemplary embodiments, wherein the validation environment is a target server which is a production data center, and in migrating the transformed project to the target server, and wherein the instructions, when executed, may further cause the processor 104 to perform the following: copying attachments associated with the project from a source server to the target server.

According to exemplary embodiments as disclosed above in FIGS. 1-6, technical improvements effected by the instant disclosure may include platforms for implementing a PTMM that automatically transforms projects to a standardized LOB configuration and automatically migrates the transformed projects to data center servers, but the disclosure is not limited thereto. According to exemplary embodiments as disclosed above in FIGS. 1-6, technical improvements effected by the instant disclosure may include platforms for implementing a PTMM which implements a safety mechanism that protects production data by offloading the transformation process to containerized JIRAs (Docker containers running in an open-source container-orchestration system (i.e., Kubernetes)) to protect production data both at the source and target, but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing automatic project transformation and migration processes by utilizing one or more processors and one or more memories, the method comprising:
   accessing a private cloud to fetch data related to a state of a project;
   posting migration mapping data to a migration director corresponding to the project based on the fetched data;
   queuing the project for processing;
   transforming the project to a standardized line of business (LOB) configuration, wherein one or more of the following operations is performed to transform the project to the standardized LOB configuration:
      generating structured query language commands data based on the mapping data;
      transforming issue types data associated with the project;
      transforming custom fields data associated with the project;
      transforming workflow statuses data associated with the project; and
      transforming schemes associated with the project;
   determining that a validation environment is in a clean configuration;
   migrating, based on determining that the validation environment is in a clean configuration, the transformed project to the validation environment;
   receiving user input to approve the migrated project;
   creating a snapshot of the project without attachments from a source server by utilizing corresponding application programming interface (API);
   downloading the snapshot to an application platform of the private cloud;
   deploying and configuring a transformation environment;
   transforming the project to the standardized LOB configuration in a containerized application form running on the application platform of the private cloud; and
   uploading and deploying the snapshot of the project to the transformation environment.

2. The method according to claim 1, wherein the validation environment is a target server.

3. The method according to claim 1, wherein the migration director is a migration director running on an application platform of the private cloud.

4. The method according to claim 1, wherein the mapping data includes one or more of the following data: issue type mapping data, custom field mapping data, and workflow status mapping data.

5. The method according to claim 1, further comprising:
removing inactive issue types data that is older than a predetermined time frame; and
removing custom fields that are not members of the standard configuration.

6. The method according to claim 1, further comprising:
creating a new snapshot of the transformed project;
downloading the new snapshot to an application platform of the private cloud; and
uploading and deploying the new snapshot to the validation environment.

7. The method according to claim 1, wherein the validation environment is a target server which is a production data center, and in migrating the transformed project to the target server, the method further comprising:
copying attachments associated with the project from a source server to the target server.

8. A system for implementing automatic project transformation and migration processes, comprising:
a source server;
a target server; and
a processor operatively connected to the source server and the target server, wherein the processor is configured to:
access a private cloud to fetch data related to a state of a project;
post migration mapping data to a migration director corresponding to the project based on the fetched data;
queue the project for processing;
transform the project to a standardized line of business (LOB) configuration wherein the processor is further configured to perform the following operations to transform the project to the standardized LOB configuration:
generate structured query language commands data based on the mapping data;
transform issue types data associated with the project;
transform custom fields data associated with the project;
transform workflow statuses data associated with the project; and
transform schemes associated with the project;
determine that a validation environment is in a clean configuration;
migrate, based on determining that the validation environment is in a clean configuration, the transformed project to the validation environment;
receive user input to approve the migrated project;
create a snapshot of the project without attachments from a source server by utilizing corresponding application programming interface (API);
download the snapshot to an application platform of the private cloud;
deploy and configure a transformation environment;
transform the project to the standardized LOB configuration in a containerized application form running on the application platform of the private cloud; and
upload and deploy the snapshot of the project to the transformation environment.

9. The system according to claim 8, wherein the validation environment is a target server.

10. The system according to claim 8, wherein the migration director is a migration director running on an application platform of the private cloud.

11. The system according to claim 8, wherein the mapping data includes one or more of the following data: issue type mapping data, custom field mapping data, and workflow status mapping data.

12. The system according to claim 8, wherein the processor is further configured to:
remove inactive issue types data that is older than a predetermined time frame; and
remove custom fields that are not members of the standard configuration.

13. The system according to claim 8, wherein the processor is further configured to:
create a new snapshot of the transformed project;
download the new snapshot to an application platform of the private cloud; and
upload and deploy the new snapshot to the validation environment.

14. The system according to claim 8, in the validation environment is a target server which is a production data center, and in migrating the transformed project to the target server, the processor is further configured to:
copy attachments associated with the project from a source server to the target server.

15. A computer readable hardware storage device that permanently stores instructions for implementing automatic project transformation and migration processes, wherein, when executed, the instructions cause a processor to perform the following:
accessing a private cloud to fetch data related to a state of a project;
posting migration mapping data to a migration director corresponding to the project based on the fetched data;
queuing the project for processing;
transforming the project to a standardized line of business (LOB) configuration, wherein one or more of the following operations is performed to transform the project to the standardized LOB configuration:
generating structured query language commands data based on the mapping data;
transforming issue types data associated with the project;
transforming custom fields data associated with the project;
transforming workflow statuses data associated with the project; and
transforming schemes associated with the project;
determining that a validation environment is in a clean configuration;
migrating, based on determining that the validation environment is in a clean configuration, the transformed project to the validation environment;
receiving user input to approve the migrated project;
creating a snapshot of the project without attachments from a source server by utilizing corresponding application programming interface (API);
downloading the snapshot to an application platform of the private cloud;
deploying and configuring a transformation environment;
transforming the project to the standardized LOB configuration in a containerized application form running on the application platform of the private cloud; and
uploading and deploying the snapshot of the project to the transformation environment.

16. The computer readable hardware storage device according to claim 15, wherein the validation environment is a target server.

17. The computer readable hardware storage device according to claim 15, wherein the migration director is a migration director running on an application platform of the private cloud.

18. The computer readable hardware storage device according to claim 15, wherein the mapping data includes one or more of the following data: issue type mapping data, custom field mapping data, and workflow status mapping data.

19. The computer readable hardware storage device according to claim 15, wherein the instructions, when executed, further cause the processor to perform the following:
- removing inactive issue types data that is older than a predetermined time frame; and
- removing custom fields that are not members of the standard configuration.

20. The computer readable hardware storage device according to claim 15, wherein the instructions, when executed, further cause the processor to perform the following:
- creating a new snapshot of the transformed project;
- downloading the new snapshot to an application platform of the private cloud; and
- uploading and deploying the new snapshot to the validation environment.

\* \* \* \* \*